(12) United States Patent
Kuwabara

(10) Patent No.: US 7,748,905 B2
(45) Date of Patent: Jul. 6, 2010

(54) LINEAR MOTION ROLLING GUIDE UNIT

(75) Inventor: Hideki Kuwabara, Mino (JP)

(73) Assignee: Nippon Thompson Co., Ltd., Minato-Ku, Tokyo (JP)

( * ) Notice: Subject to any disclaimer, the term of this patent is extended or adjusted under 35 U.S.C. 154(b) by 458 days.

(21) Appl. No.: 11/776,762

(22) Filed: Jul. 12, 2007

(65) Prior Publication Data

US 2008/0013870 A1  Jan. 17, 2008

(30) Foreign Application Priority Data

Jul. 13, 2006  (JP) .............................. 2006-192666

(51) Int. Cl.
*F16C 29/06* (2006.01)
*F16C 33/72* (2006.01)

(52) U.S. Cl. .......................................... 384/15; 384/45

(58) Field of Classification Search ................... 384/15, 384/43–45, 49, 51

See application file for complete search history.

(56) References Cited

U.S. PATENT DOCUMENTS

| | | | | |
|---|---|---|---|---|
| 5,087,130 A | * | 2/1992 | Tsukada | 384/45 |
| 5,209,575 A | * | 5/1993 | Ohtake | 384/15 |
| 5,324,116 A | * | 6/1994 | Agari | 384/15 |
| 5,342,127 A | * | 8/1994 | Agari | 384/15 |
| 5,358,336 A | * | 10/1994 | Agari | 384/45 |
| 5,360,271 A | * | 11/1994 | Agari | 384/43 |
| 5,362,155 A | * | 11/1994 | Ichida | 384/45 |
| 5,388,911 A | * | 2/1995 | Agari | 384/15 |
| 5,464,288 A | * | 11/1995 | Tanaka | 384/45 |
| 6,030,124 A | * | 2/2000 | Moseberg et al. | 384/15 |
| 6,250,805 B1 | * | 6/2001 | Kuwahara | 384/45 |

FOREIGN PATENT DOCUMENTS

| JP | 09317764 A | * | 12/1997 |
|---|---|---|---|
| JP | 2006307919 | | 11/2006 |

* cited by examiner

*Primary Examiner*—Marcus Charles
(74) *Attorney, Agent, or Firm*—Cozen O'Connor

(57) ABSTRACT

A linear motion rolling guide unit with underside seals not falling away from a slider even when mounting the slider on a track rail. An engaging member comprises a protrusion having two faces extending parallel to the sliding direction of the slider, one facing the track rail and the other facing away the track rail. The protrusion comprises an inner hook protruding toward the track rail and an outer hook protruding in the opposite direction and being out of phase with the inner hook in the sliding direction of the slider, and moves through the fitting hole while being elastically deformed in the process of pressing the engaging member into the fitting hole after the inner hook has been engaged with the fitting hole, and returns to its original shape when the outer hook passes through the fitting hole, whereby the inner and outer hooks hold the underside seal.

2 Claims, 10 Drawing Sheets

LINEAR MOTION ROLLING GUIDE UNIT

FIELD OF THE INVENTION

This invention relates to a linear motion rolling guide unit having a slider sliding along a track rail.

DESCRIPTION OF THE RELATED ART

Such a linear motion rolling guide unit as described above has been already disclosed by the present applicant in Japanese Unexamined Patent Publication No. 2006-307919, in which hook members are provided on the slider in order to prevent dust from entering into the slider from the gap between the slider and the track rail, and also an underside seal is provided between the hook members.

The underside seal is designed to have a simplified attaching structure for the purpose of improvement in the efficiency of workability of attaching/detaching the underside seal to/from the slider.

In the above-described linear motion rolling guide unit, the underside seal has an elastic force, and is elastically deformed when engaging with the hook member. As a result, the underside seal can be reliably maintained without easily falling away from the slider when in use.

In normal use, the underside seal of the above linear motion rolling guide unit will seldom fall away from the slider. This is because an external force does not generally act on the underside seal under the condition of the slider being mounted on the track rail. In other words, if an external force does not act on the underside seal, then the underside seal can be definitely maintained in use with a simplified attaching structure.

However, in the process of mounting the slider on the track rail, the underside seal may fall away from the slider due to human error.

Specifically, a strict dimensional relationship must be maintained between the slider and the track rail, and the underside seal held on the slider must be pressed against the track rail. Accordingly, when the slider is mounted on the track rail, the underside seal must be pressed in from one end of the track rail.

In the process of mounting the slider on the track rail, the worker generally holds the slider with his hand for mounting it. Thus, for pressing the slider as described above, the worker may possibly inadvertently hold the slider more strongly than necessary in some cases.

In this case, the underside seal receives a force moving the underside seal up toward the track rail.

However, the structure of the linear motion rolling guide unit as described above has been simplified in order to prevent the underside seal from falling away in use and to facilitate the attaching/detaching process for the underside seal. At the same time, this structure simplification is not designed on the assumption that the underside seal will be pushed up toward the track rail. As a result, if a force acts on the underside seal to move it up toward the track rail, the underside seal easily falls away from the slider, thus reducing the operating efficiency of mounting the slider on the track rail, resulting in the diminished efficiency of the process of attaching/detaching the underside seal.

SUMMARY OF THE INVENTION

It is an object of the present invention to provide a linear motion rolling guide unit having an underside seal attached to a slider without falling away even in the process of mounting the slider on the track rail.

The present invention provides a linear motion rolling guide unit which comprising: a slider that slides along a track rail, is provided with a pair of end caps at ends of a casing, and has guiding grooves formed therein to endlessly extend through the end caps for allowing rolling elements to roll in the guiding grooves; and a pair of underside seals that are provided between the end caps and engaged with the end caps. The end caps comprises engaging members protruding therefrom, and the underside seals have fitting holes formed therein. The engaging members are fitted into the fitting holes to hold the underside seals and keep the underside seals in contact with the track rail and the slider for prevention of the intrusion of dust and foreign matter into the guiding grooves of the slider.

The linear motion rolling guide unit of the present invention is characterized in that: each of the engaging members comprises a protrusion having a pair of faces extending parallel to a sliding direction of the slider, one face facing the track rail and the other face facing in a direction opposite to the track rail; the protrusion comprises an inner hook protruding toward the track rail and an outer hook protruding in a direction opposite to the track rail and being out of phase with the inner hook in the sliding direction of the slider; the protrusion moves through the fitting hole while being elastically deformed in a process of pressing the engaging member into the fitting hole provided in the underside seal after the inner hook has been engaged with the fitting hole; and the protrusion returns to its original shape when the outer hook passes through the fitting hole, whereby the inner hook and the outer hook hold the underside seal.

The linear motion rolling guide unit of the present invention is characterized in that: each of the underside seals comprises a cored bar and an elastic material overlying the cored bar; the cored bar has a through hole formed therein and maintained at a length in a longitudinal direction corresponding to a length from the inner hook to the outer hook; the through hole is made up of two portions, a widened portion positioned corresponding to the inner hook and having a width greater than a sum of widths of the inner hook and the protrusion, and a narrowed portion positioned corresponding to the outer hook and having a width smaller than the widened portion and greater than a sum of widths of the outer hook and the protrusion; the elastic material after overlying the cored bar has a hole formed therein corresponding to the through hole, and an elastic lip extending from a rim of the hole toward the center of the hole beyond a rim of the through hole and having an inner edge; the inner edge of the elastic lip forms a hook receiving hole; and the through hole and the hook receiving hole are combined together to form the fitting hole.

The linear motion rolling guide unit of the present invention is also characterized in that the protrusion further comprises a thick-walled portion formed in a position corresponding to inner hook and protruding toward the track rail.

According to the present invention, because the linear motion rolling guide unit is designed to facilitate the installation of underside seals for preventing the intrusion of dust, it is possible to enhance the efficiency of attaching/detaching the underside seals.

Because the outer hook extends from the protrusion in the direction opposite to the direction in which the inner hook extends from the protrusion, the outer hook can reliably hold the underside seal even when a force is applied to the underside seal to move it up toward the track rail.

In consequence, the underside seal does not easily fall away from the slider even in the process of mounting the slider on the track rail, leading to the improvement of the efficiency of the operation of mounting the sliders on the track rails.

According to the present invention, further, because the cored bar is used in the underside seal, the strength of the underside seal can be ensured. Also, because the cored bar is covered with the elastic material and the inner edge of the lip portion provided in the elastic material forms the hook receiving hole, it is possible to reliably hold the two hooks with the elastic force of the elastic material as well as to tightly seal the fitting hole to reliably prevent the intrusion of dust and the like. In consequence, the underside seal does not fall away from the slider either in service of the linear motion rolling guide unit or in the assembly process, so that the underside seal can be reliably held.

According to the present invention, further, because the thick-walled portion is provided on the portion of the protrusion corresponding to the inner hook to extend toward the track rail, the protrusion can reliably hold the underside seal without being bent or damaged even when the engaging member is fitted into the fitting hole and when a reactive force from the track rail is applied to the protrusion.

Since the underside seal is able to be reliably held, this makes it possible to reliably press the underside seal to the track rail so as to prevent dust from entering the guide groove.

DETAILED DESCRIPTION OF THE PREFERRED EMBODIMENT

An embodiment according to the present invention will be described with reference to FIG. 1 to FIG. 12.

Figure 1:
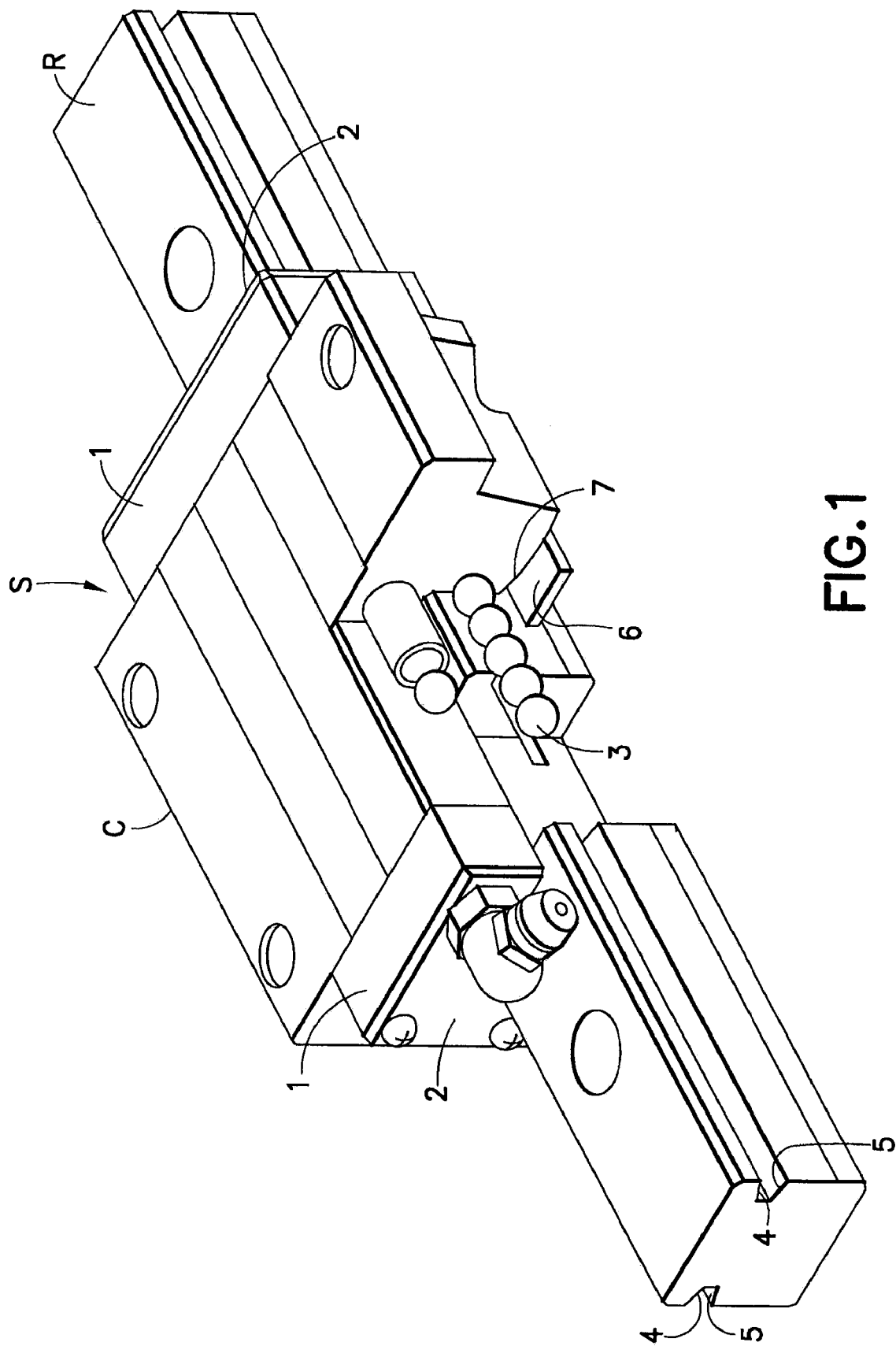
FIG. 1 is a view illustrating a linear motion rolling guide unit of an embodiment according to the present invention.

FIG. 1 shows a well-known linear motion rolling guide unit. In FIG. 1, a slider S, which runs on the track rail R, includes a casing c, a pair of end caps 1 attached to the two respective ends of the casing c, and a pair of end seals 2 provided on the outer side of the respective end caps 1.

Endless guiding grooves extend through the end caps 1 in the slider S. Rolling elements 3 such as ball and cylindrical rollers are incorporated in the endless guide grooves. The rolling elements 3 roll on the upper raceway face 4 and the lower raceway face 5 of the track rail R to allow the slider S to smoothly run on the track rail R.

If dust enters into an area of the raceway faces 4 and 5, particularly, the lower raceway faces 5, and the rolling elements 3 rolling on the lower raceway faces 5, the dust impedes the smooth rolling movement of the rolling elements 3. Underside seals 6 are provided in order to prevent dust from entering between the lower raceway faces 5 and the rolling elements 3. The underside seals 6 are disposed to extend along inclined faces 7, which are formed on the casing c to create clearance for the machining process, of the two sides of the slider S which respectively face the lower raceway faces 5. In the following description, the same reference numerals denote components for each of the underside seals 6 on the both sides and the entire attaching structure thereof.

Figure 2:
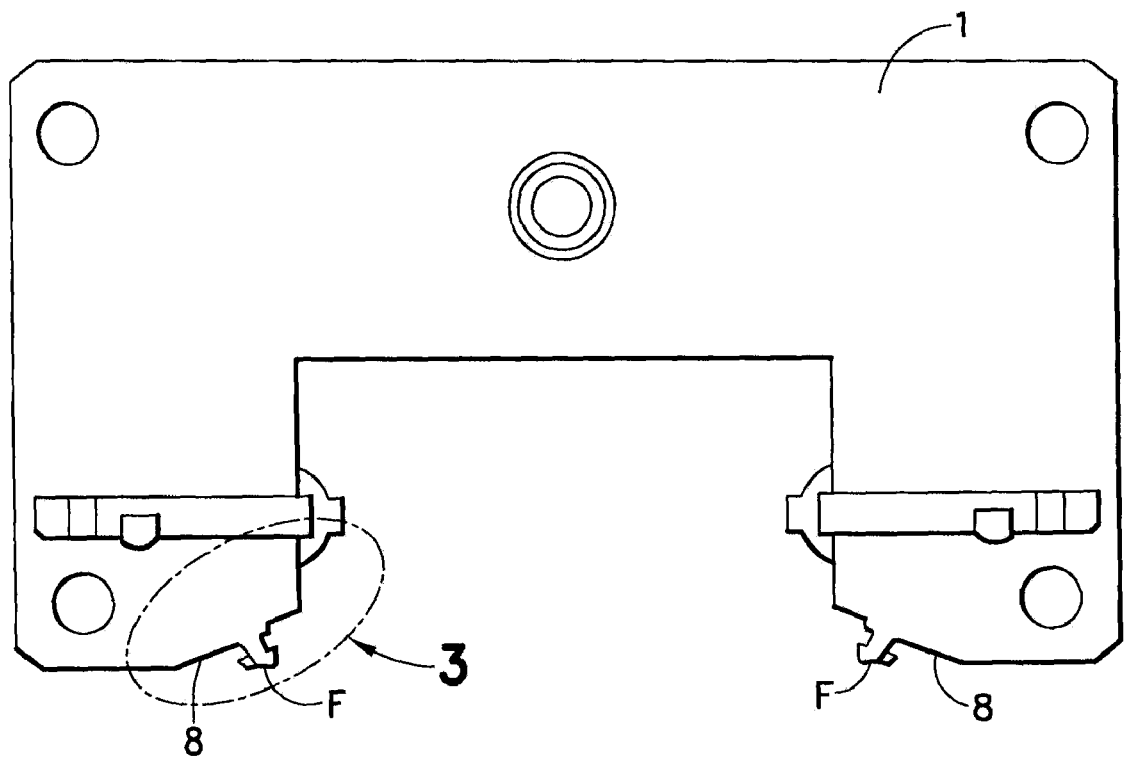
FIG. 2 is a side view of an end cap.

As illustrated in FIG. 2, an inclined face 8 is formed on each of the end caps 1 of the slider S in correspondence with the inclined face 7 formed on the casing c. An engaging member F protrudes from the inclined face 8 for engaging with the underside seal 6. The specific shape will be described next with reference to FIGS. 3 and 4.

Figure 3:
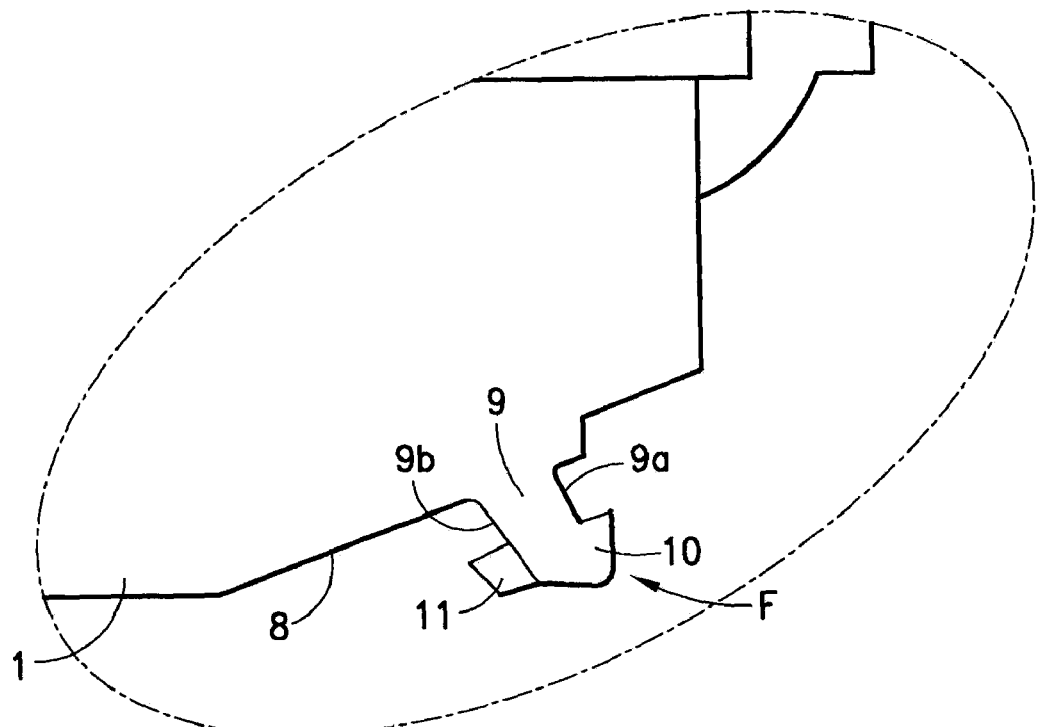
FIG. 3 is a partially enlarged view of the end cap.
Figure 4:
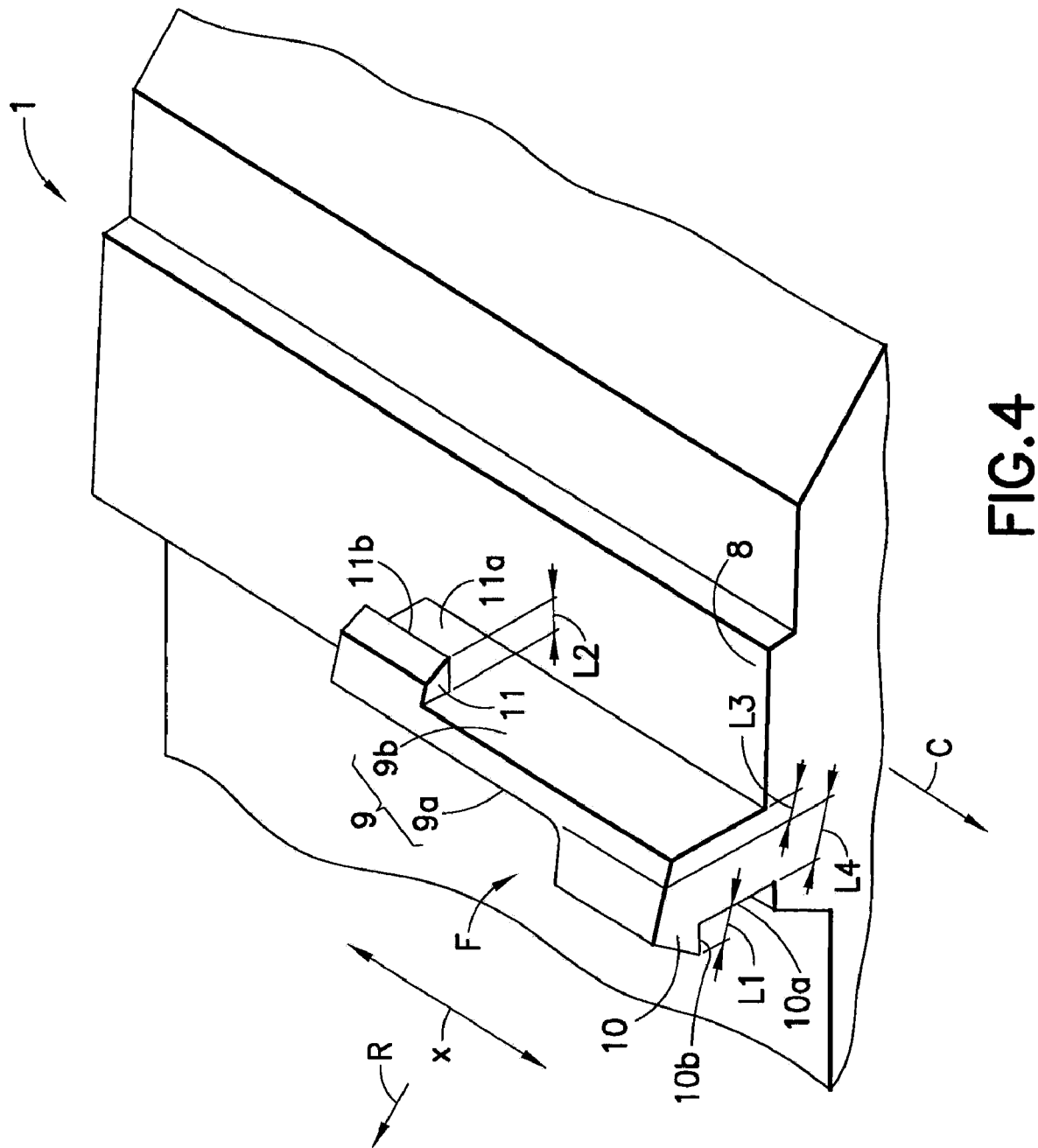
FIG. 4 is a view illustrating an engaging member.

As illustrated in FIG. 3, the engaging member F includes a protrusion 9 extending out at right angles from the inclined face 8 of the end cap 1. As illustrated in FIG. 4, the protrusion 9 has a pair of parallel protrusion faces 9a, 9b extending in the thickness direction of the end cap 1, that is, in the sliding direction of the slider S (in the x direction in FIG. 4) sliding after being mounted on the track rail R. One protrusion face 9a of the protrusion 9 faces the track rail R and the other protrusion face 9b is situated facing in the direction opposite to the track rail R.

An inner hook 10 extends out from the protrusion face 9a of the protrusion 9 toward the track rail R at the end of the protrusion 9 closer to the casing c, and likewise at the other end, an outer hook 11 extends out from the protrusion face 9b of the protrusion 9 toward the side facing away from the track rail R. In this manner, the hooks 10, 11 are disposed out of phase with each other in the length direction of the protrusion 9, that is, in the sliding direction of the slider S.

The projecting portion 9 has a thickness L3 in a direction at right angles to the sliding direction of the slider S, and is provided with a thick-walled portion having a thickness L4 extending from the protrusion face 9a toward the track rail R over an area corresponding to the length of the inner hook 10.

The face of the protrusion 9 facing the track rail R, which corresponds to the inner hook 10, is defined as the inner-hook opposing face 10a. The face of the protrusion 9 facing away from the track rail R, which corresponds to the outer hook 11, is defined as the outer-hook opposing face 11a.

The face of the inner hook 10 facing the inclined face 8 of the end cap 1 is defined as the inner holding face 10b. The face of the outer hook 11 facing the inclined face 8 of the end cap 1 is defined as the outer holding face 11b.

The outer hook 11 extends out from the protrusion face 9b of the protrusion 9 toward the area facing away from the track rail R by a thickness L2. The inner hook 10 extends out from the protrusion face 9a of the protrusion 9 by a thickness L1.

The engaging member F comprising the protrusion 9, the inner hook 10 and the outer hook 11 as described above engages with a later-described fitting hole formed in the underside seal 6 so as to fix the underside seal 6 to the end caps 1. The structure of the underside seal 6 will be described next with reference to FIG. 5 to FIG. 9.

Figure 5:
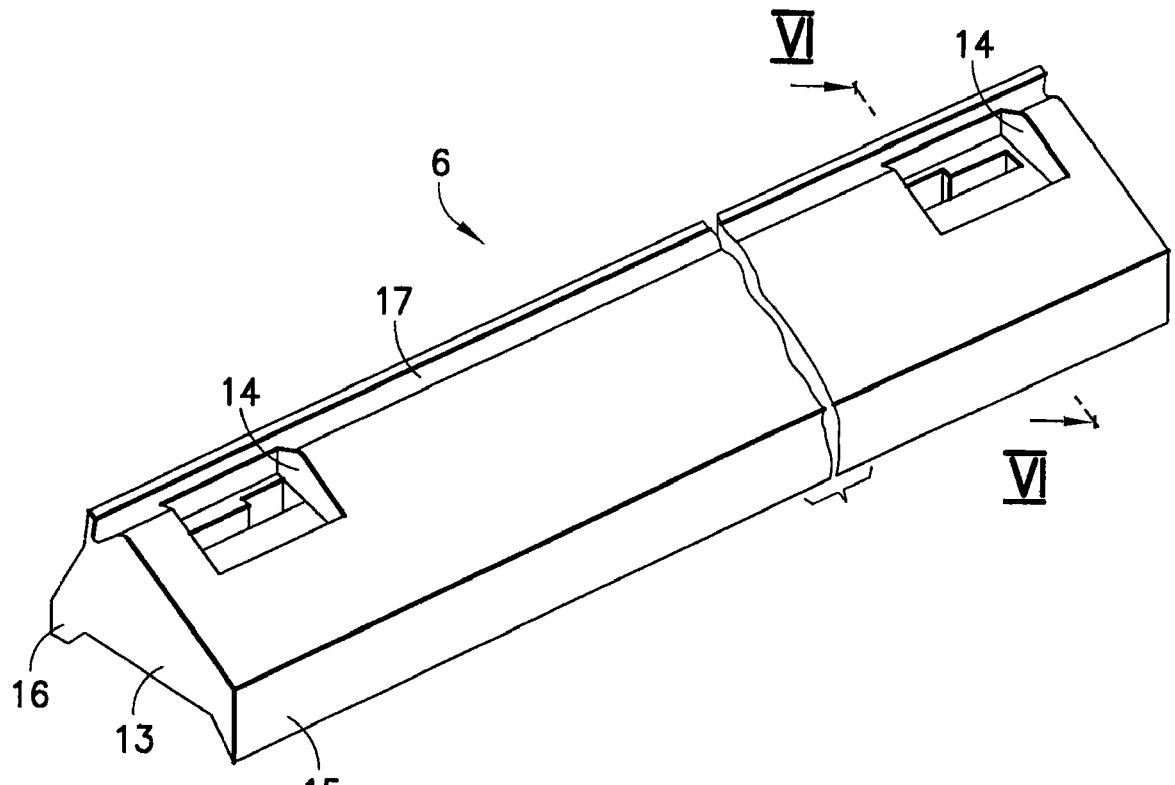
FIG. 5 is a perspective view of an underside seal.
Figure 6:
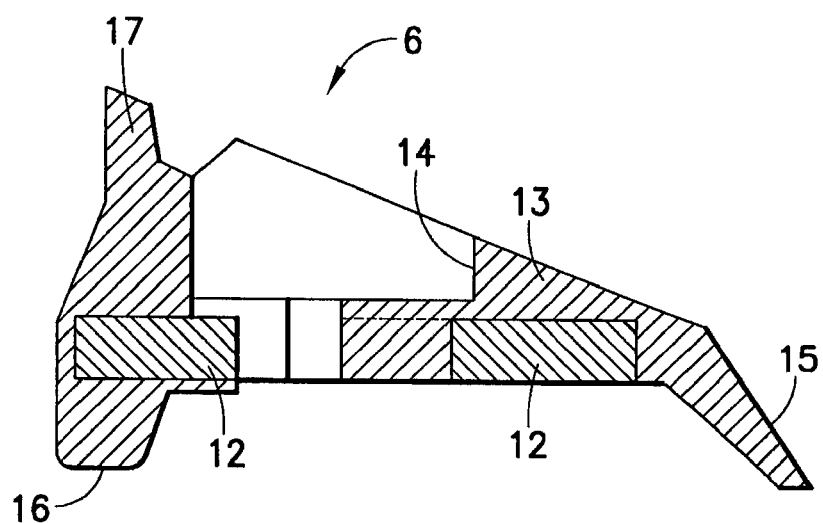
FIG. 6 is a sectional view taken along the VI-VI line in FIG. 5.

As illustrated in FIG. 5, the underside seal 6 has an elastic material 13 overlying later-described cored bar 12, and has a length in its longitudinal direction approximately equal to the length of the slider S in the sliding direction. Holes 14 are respectively formed in the two ends of the underside seal 6 in the longitudinal direction. As illustrated in FIG. 6, the underside seal 6 is shaped in cross section such that one side thereof in the width direction (the right side in FIG. 6) is inclined in such a manner as to gradually decrease in thickness toward the leasing end, and at the leading end a slider-side lip 15 is formed.

On the other hand, on the opposite side to the slider-side lip 15 in the width direction of the underside seal 6 (on the left side in FIG. 6), an end-cap-side lip 16 protrudes to the same level as the slider-side lip 15. The end-cap-side lip 16 has a length in the longitudinal direction approximately equal to the thickness of the end cap 1 (the thickness in the sliding direction of the slider S).

On the same side as the end-cap-side lip 16, a track-rail-side lip 17 extends in the longitudinal direction of the underside seal 6 on the upper side in FIG. 6 in the thickness direction of the underside seal 6 (see FIG. 5).

As described earlier, the underside seal 6 has an elastic material 13 overlying the cored bar 12. The dimensional relationship and the relative positional relationship between the cored bar 12 and the engaging member F will be described next with reference to FIG. 7 and FIG. 8.

Figure 7:
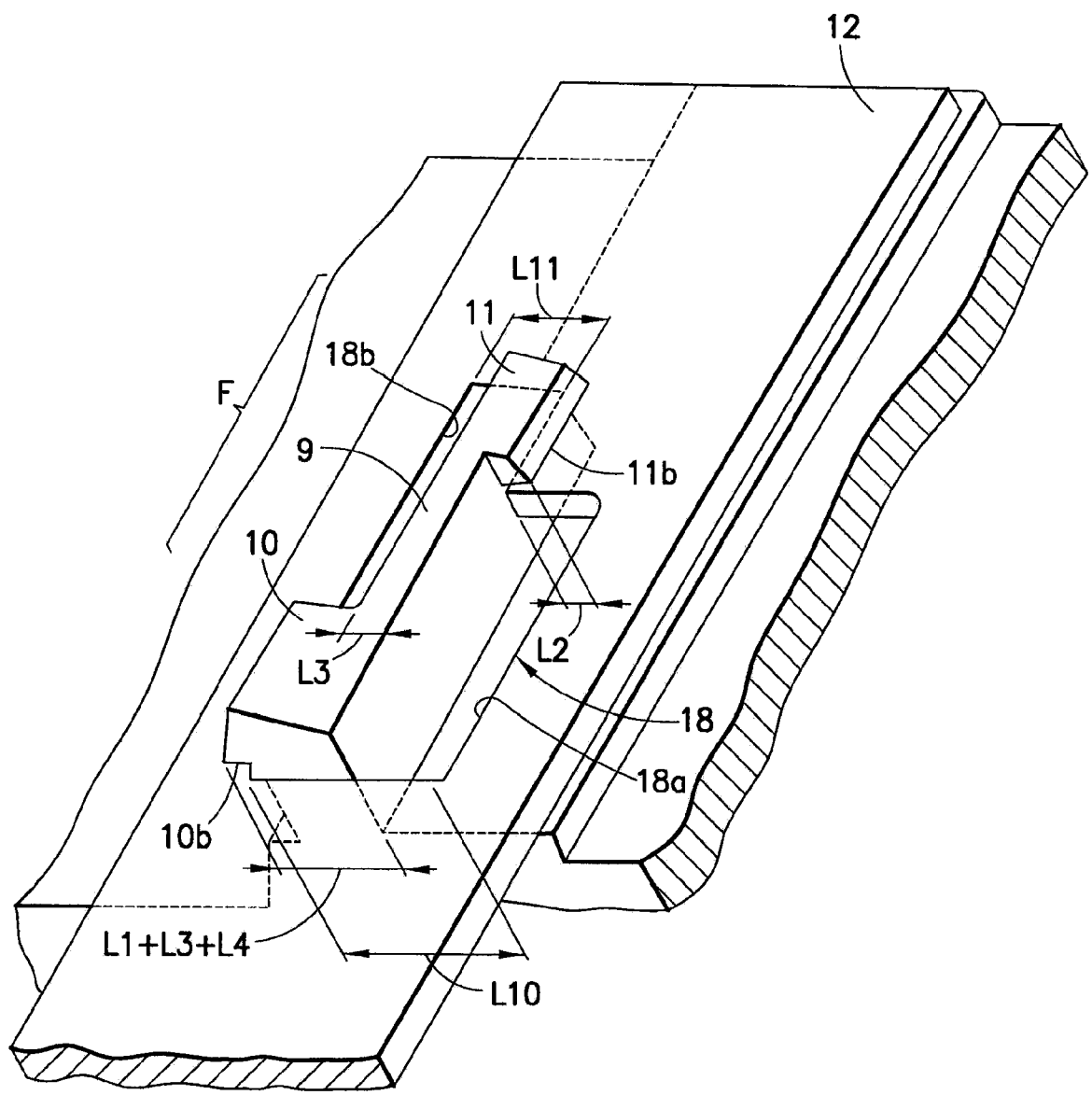
FIG. 7 is a perspective view illustrating the engaging member fitted into a through hole of a cored bar.
Figure 8:
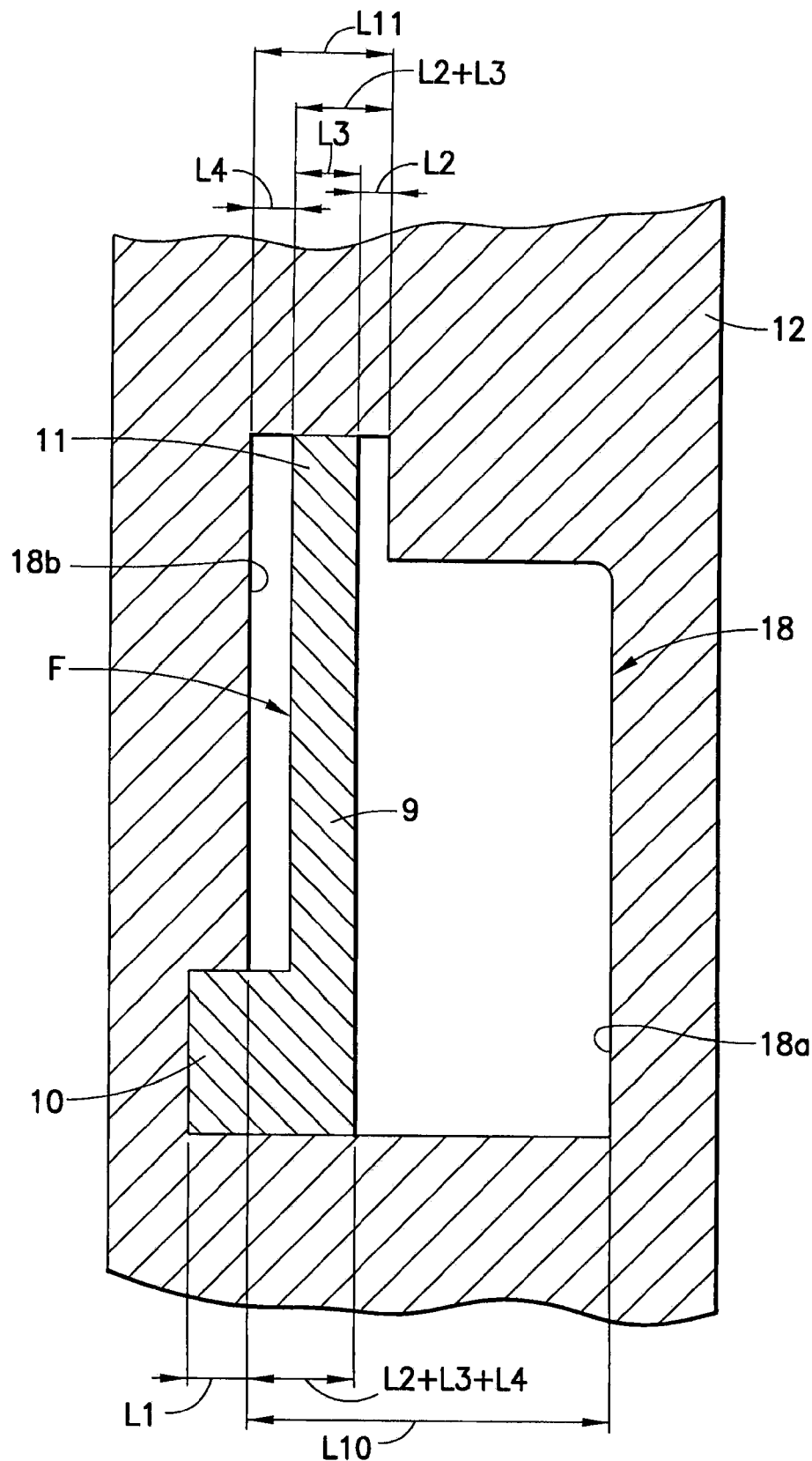
FIG. 8 is a plan view illustrating the engaging member fitted into a through hole of a cored bar.

FIGS. 7 and 8 show the relationship between the cored bar 12 before being overlaid with the elastic material 13 and the engaging member F. The cored bar 12 has through holes 18 formed at its two ends in the longitudinal direction. Each of the through holes 18 is maintained at a length in the longitudinal direction corresponding to the longitudinal-direction length of the protrusion 9 forming part of the engaging member F, in other words, the length from the inner hook 10 to the outer hook 11.

The through hole 18 is made up of a widened portion 18*a* corresponding to the inner hook 10 and a narrowed portion 18*b* corresponding to outer hook 11. The width L10 of the widened portion 18*a* is greater than the total thickness L3+L4+L1 of the thickness of the portion of the protrusion 9 corresponding to the inner hook 10 and the protruding thickness of the inner hook 10. The width L11 of the narrowed portion 18*b* is greater than the total thickness L3+L2 of the thickness of the portion of the protrusion 9 corresponding to the outer hook 11 and the protruding thickness of the outer hook 11. The width L11 of the narrowed portion 18*b* is smaller than the width L10 of the widened portion 18*a*.

As shown in FIG. 7, the dimensional relationship between the cored bar 12 and the engaging member F is maintained such that a gap is created in the widened portion 18*a* between the protrusion face 9*b* of the protrusion 9 and the through hole 18 and a gap is created in the narrowed portion 18*b* between the protrusion face 9*a* and the through hole 18 after the surface of the cored bar 12 is engaged with the holding faces 10*b* and 11*b* of the hooks 10 and 11.

Figure 9:
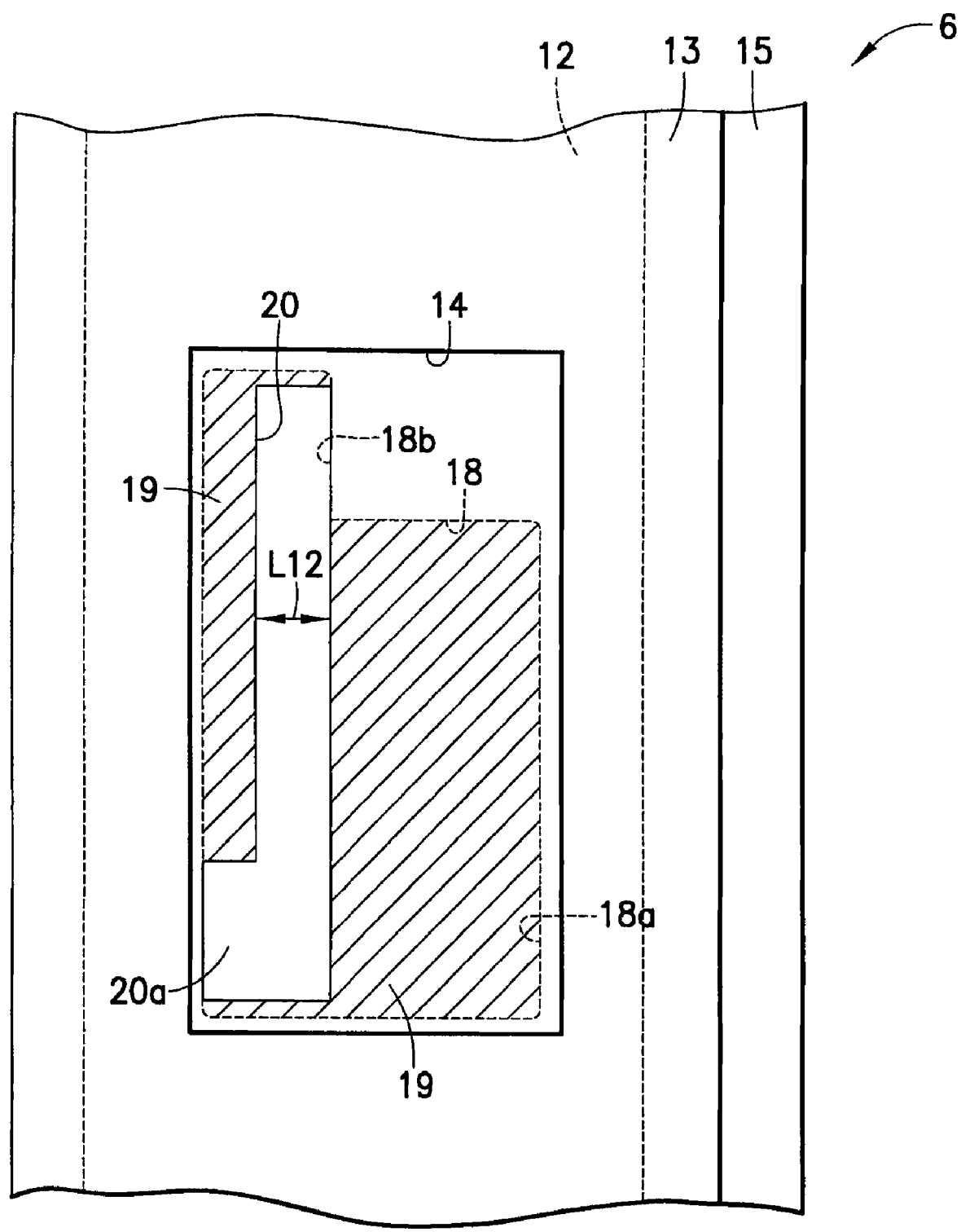
FIG. 9 is a diagram illustrating the cored bar overlaid with an elastic material.

As shown in FIG. 9, a hole 14 is formed in the elastic material 13 so as to be aligned with each through hole 18 when the cored bar 12 structured as described above is overlaid with the elastic material 13. An elastic lip 19 (the diagonally shaded area in FIG. 9) is formed in the periphery of the hole 14 so as to extend inward from the rim of the through hole 18. The inner edge of the elastic lip 19 forms a hook receiving hole 20.

As shown in FIG. 9, the hook receiving hole 20 is elongated in the longitudinal direction of the underside seal 6, and has a length slightly shorter than the longitudinal-direction length of the through hole 18 because the elastic material overlies the cored bar 12. The width L12 of the hook receiving hole 20 is slightly smaller than the thickness L3 of the protrusion 9 which forms part of the engaging member F to exercise a sealing effect.

The combination of the through hole 18 formed in the cored bar 12 and the hook receiving hole 20 formed in the elastic material 13 forms the fitting hole of the present invention. The elastic lip 19 extending toward the center of the through hole 18 makes it possible to prevent the intrusion of dust and the like from the fitting hole.

The elastic lip 19 is not provided in most of the area of the widened portion 18*a* opposite the inner-hook opposing face 10*a* of the inner hook 10 (on the left side of the widened portion 18*a* in FIG. 8), so that the cored bar 12 is exposed to increase the engaging force. Accordingly, a wider hole 20*a* is formed in the portion of the hook receiving hole 20 corresponding to the inner hook 10. Also, the thick-walled portion of the protrusion 9 is fitted into the wider portion 20*a* when the engaging member F is fitted into the hook receiving hole 20.

The elastic lip 19 is not provided in most of the area of the narrowed portion 18*b* opposite the outer-hook opposing face 11*a* of the outer hook 11 (on the right side of the narrowed portion 18*b* in FIG. 8), so that the cored bar 12 is exposed. Accordingly, the through hole 18 and the hook receiving hole 20 are flush with each other on the opposite side of the narrowed portion 18*b* from the track rail R (the right side in FIG. 8).

The steps for mounting the underside seal 6 to the slider S will be described next with reference to FIG. 10 to FIG. 12.

Figure 10:
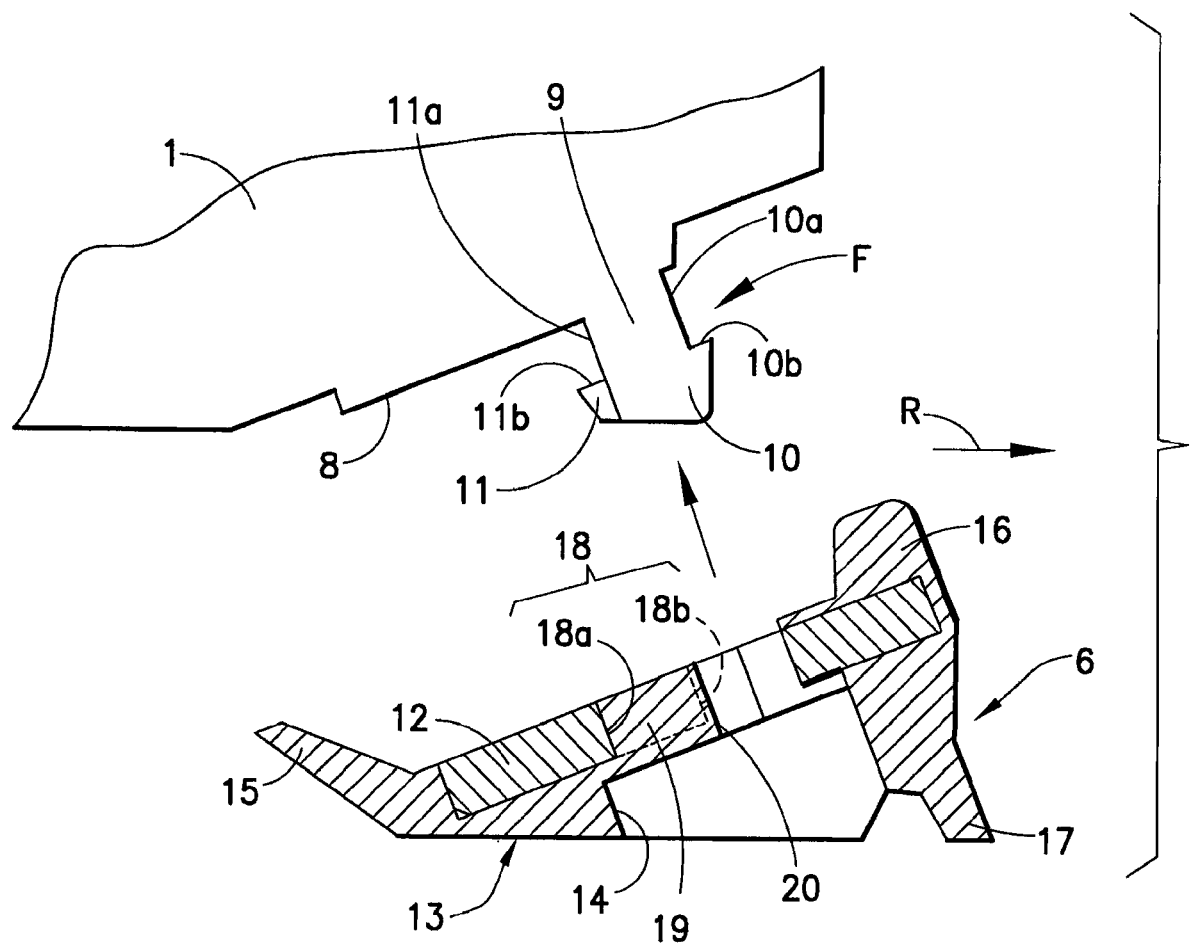
FIG. 10 is a diagram illustrating a first stage for fixing the underside seal to the engaging member.

As shown in FIG. 10, the slider-side lip 15 and the end-cap-side lip 16 are directed toward the inclined face 8 formed on the end cap 1, and then the engagement member F is fitted into the fitting hole (the hook receiving hole 20 and the through hole 18) provided in the underside seal 6.

Figure 11:
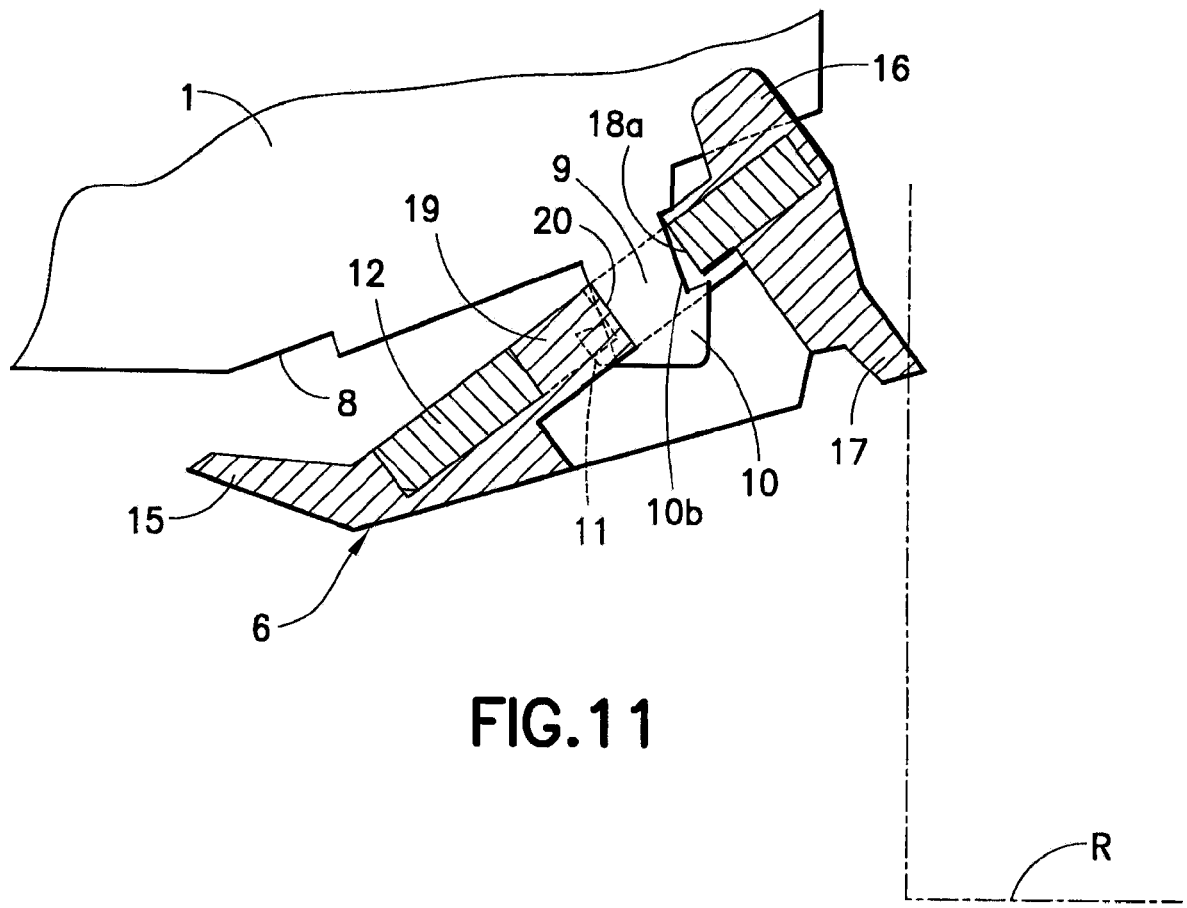
FIG. 11 is a diagram illustrating a second stage for fixing the underside seal to the engaging member.
Figure 12:
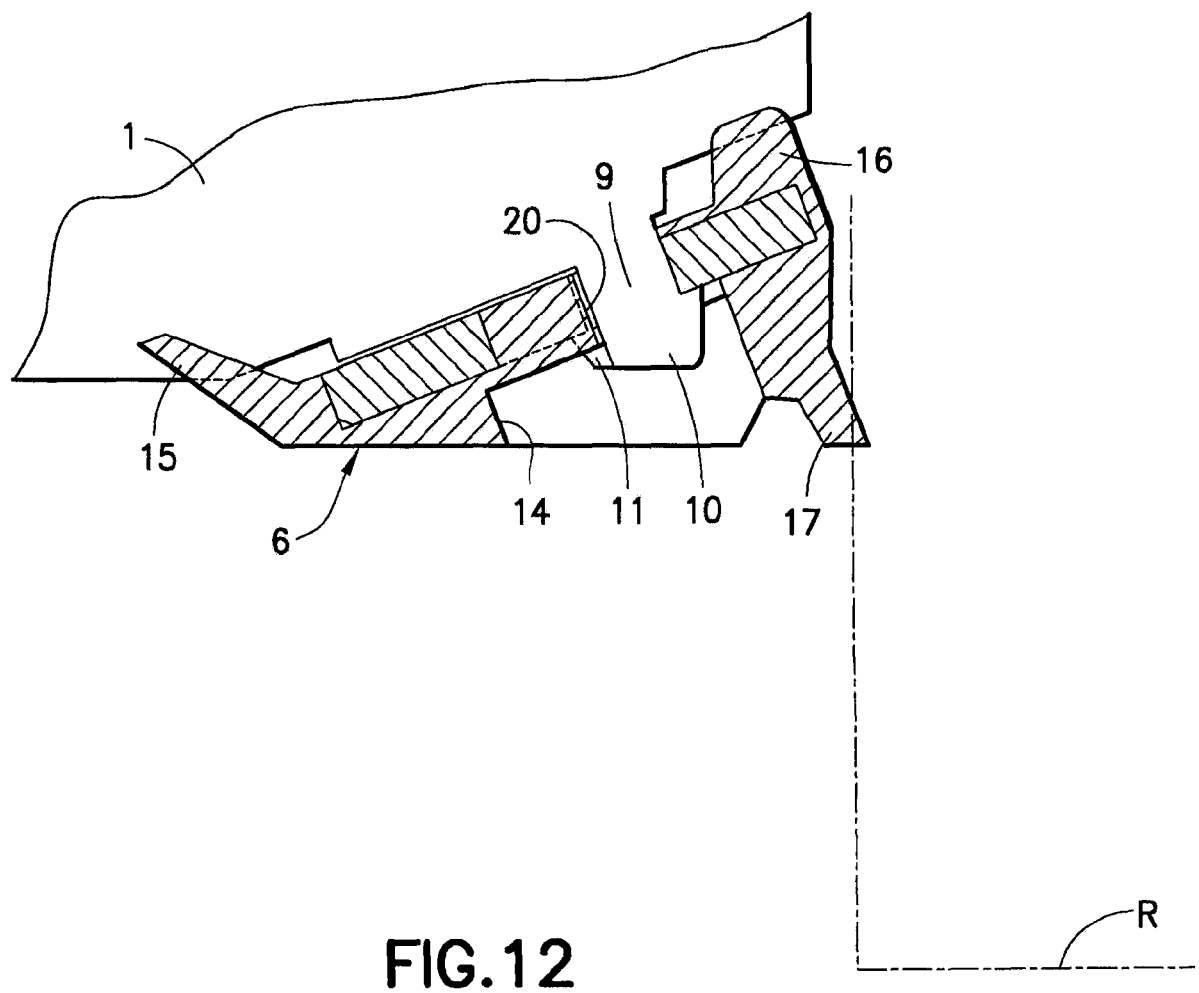
FIG. 12 is a diagram illustrating a third stage for fixing the underside seal to the engaging member.

At this point, as shown in FIG. 11, the end-cap-side lip 16 is pressed against the inclined face 8 of the end cap 1, and the engaging member F is fitted into the fitting hole (the hook receiving hole 20) such that the inner hook 10 passes through the through hole 18 of the cored bar 12.

Thereupon, the protrusion 9 gradually moves into the hook receiving hole 20 while forcing the elastic lip 19 to make way, in other words, enlarging the hook receiving hole 20 formed in the elastic material 13. That is, as illustrated in FIG. 7, since the width L10 of the widened portion 18*a* of the through hole 18 is greater than the total thickness L1+L3+L4 of the inner hook 10 and the protrusion 9, when the engaging member F is pressed into the fitting hole, the engaging member F can move forward while causing the elastic lip 19 extending out from the edge of the hole 14 of the elastic material 13 to make way.

Then, the inner holding face 10*b* of the inner hook 10 is engaged with the widened portion 18*a* in the cored bar 12. The underside seal 6 is then rotated in the clockwise direction in FIG. 11, and then the outer hook 11 is pressed into the narrowed portion 18*b* in the cored bar 12.

At this point, as shown in FIG. 7, the width L11 of the narrowed portion 18*b* is greater than the total thickness L2+L3 of the outer hook 11 and the protrusion 9, and also the narrowed portion 18*b* is elongated in the sliding direction of the slider S. Accordingly, when the underside seal 6 is rotated in the clockwise direction so as to press the engaging member F (the outer hook 11) into the fitting hole after the inner holding face 10*b* has been engaged with the widened portion 18*a*, the outer hook 11 including the protrusion 9 is elastically deformed and moves forward while causing the elastic lip 19 to make way. In other words, after the inner hook 10 has been fitted into the fitting hole (the through hole 18 and the hook receiving hole 20) provided in the underside seal 6, the outer hook 11 is elastically deformed to be fitted into the fitting hole. The outer hook 11 is elastically deformed again after passing though the fitting hole so as to return to its original shape, with the result that the outer holding face 11*b* holds the surface of the cored bar 12. In this manner, the hooks 10 and 11 hold the cored bar 12, whereby the underside seal 6 is held by the engaging member F.

In this manner, after the hooks 10 and 11 have passed through the fitting hole so as to hold the underside seal 6, the elastic lip 19 functions to tightly seal the protrusion faces 9a and 9b (the hook opposing faces 10a, 11a) of the protrusion 9.

That is, the elastic lip 19 is promptly deformed by the engaging member F when the underside seal 6 is fixed to the end cap 1, and then functions reliably to tightly seal and secure the engaging member F with its elastic force after the underside seal 6 has been fixed to the end cap 1.

According to the embodiment of the present invention, as described above, when the underside seal 6 is fixed to the slider S, the slider-side lip 15 and the end-cap-side lip 16 are pressed against the inclined face 8 of the end cap 1 and the inclined face 7 of the slider S. In this condition, when the slider S is mounted on the track rail R, the track-rail-side lip 17 comes into contact with the side face of the track rail R as shown in FIG. 12. As a result, it is possible to prevent the intrusion of dust and the like from the gap between the track rail R and the slider S into the guide groove.

Since the underside seal 6 can easily be attached to the end cap, it is possible to improve the efficiency of the attaching/detaching operation for the underside seal 6.

Since the cored bar 12 is used in the underside seal 6, this makes it possible to ensure the strength of the underside seal 6. The hooks 10 and 11 are engaged with the cored bar 12, so that the hooks 10 and 11 can reliably hold the underside seal 6.

In addition, because the outer hook 11 is designed to extend from the protrusion 9 in the direction opposite to the direction in which the inner hook 10 extends from the protrusion 9, if the underside seal 6 receives a force pushing a portion of it upward closer to the track rail R, the outer hook 11 reliably holds the underside seal 6.

Accordingly, when the slider S and the track rail R are combined together, the underside seal 6 does not easily fall away from the slider S, thus improving the working efficiency of mounting the slider S on the track rail R.

The width L10 of the widened portion 18a of the through hole 18 provided in the cored bar 12 is designed to be greater than the total thickness L1+L3+L4 of the inner hook 10 and the protrusion 9, and also the width L11 of the narrowed portion 18b is designed to be greater than the total thickness L2+L3 of the outer hook 11 and the protrusion 9. For this reason, the underside seal 6 can be attached without making the hooks 10 and 11 collide with the cored bar 12. As a result, the hooks 10 and 11 do not have the risk of being damaged when the underside seal 6 is attached.

In the above embodiment, a thick-walled portion is provided in the area corresponding to the inner hook 10 in the protrusion 9. Accordingly, when the engaging member F is fitted into the fitting hole of the underside seal 6, or when a reactive force is applied to the inner hook 10 from the track-rail-side lip 17, the protrusion 9 is not bent or damaged and can reliably hold the underside seal 6.

What is claimed is:

1. A linear motion rolling guide unit comprising:
a slider that slides along a track rail, is provided with a pair of end caps at ends of a casing, and has guiding grooves formed therein to endlessly extend through the end caps for allowing rolling elements to roll in the guiding grooves; and
a pair of underside seals that are provided between the end caps and engaged with the end caps,
the end caps comprising engaging members protruding therefrom, and the underside seals having fitting holes formed therein, so that the engaging members are fitted into fitting holes to hold the underside seals and keep the underside seals in contact with the track rail and the slider for prevention of the intrusion of dust and foreign matter into the guiding grooves of the slider,
wherein each of the engaging members comprises a protrusion having a pair of faces extending parallel to a sliding direction of the slider, one face facing the track rail and the other face facing in a direction opposite to the track rail,
the protrusion comprises an inner hook protruding toward the track rail and an outer hook protruding in a direction opposite to the track rail and being out of phase with the inner hook in the sliding direction of the slider,
the protrusion moves through the fitting hole while being elastically deformed in a process of pressing the engaging member into the fitting hole provided in the underside seal after the inner hook has been engaged with the fitting hole, and
the protrusion returns to its original shape when the outer hook passes through the fitting hole, whereby the inner hook and the outer hook hold the underside seal, and wherein each of the underside seals comprises a cored bar and an elastic material overlying the cored bar, the cored bar has a through hole therein and maintained at a length in a longitudinal direction corresponding to a length from the inner hook to the outer hook, the through hole is made up of two portions, a widened portion positioned corresponding to the inner hook and having a width greater than a sum of widths of the inner hook and the protrusion, and a narrowed portion positioned corresponding to the outer hook and having a width smaller than the widened portion and greater than a sum of widths of the outer hook and the protrusion, the elastic material after overlying the cored bar has a hole formed therein corresponding to the through hole, and an elastic lip formed to ectend from a rim of the hole toward the center of the hole beyond a rim of the through hole and having an inner edge, the inner edge of the eleastic lip forms a hook receiving hole, and the through hole and the hook receiving hole are combined together to form the fitting hole.

2. A linear motion rolling guide unit according to claim 1, wherein the protrusion further comprises a thick-walled portion formed in a position corresponding to inner hook and protruding toward the track rail.

* * * * *